United States Patent
Suzuki et al.

(10) Patent No.: US 12,539,717 B2
(45) Date of Patent: Feb. 3, 2026

(54) PNEUMATIC TIRE

(71) Applicant: The Yokohama Rubber Co., LTD., Tokyo (JP)

(72) Inventors: Asuka Suzuki, Kanagawa (JP); Takamitsu Chaya, Kanagawa (JP)

(73) Assignee: The Yokohama Rubber Co., LTD., Tokyo (JP)

(*) Notice: Subject to any disclaimer, the term of this patent is extended or adjusted under 35 U.S.C. 154(b) by 42 days.

(21) Appl. No.: 18/005,308

(22) PCT Filed: Jul. 6, 2021

(86) PCT No.: PCT/JP2021/025433
§ 371 (c)(1),
(2) Date: Jan. 12, 2023

(87) PCT Pub. No.: WO2022/014403
PCT Pub. Date: Jan. 20, 2022

(65) Prior Publication Data
US 2023/0331046 A1 Oct. 19, 2023

(30) Foreign Application Priority Data
Jul. 17, 2020 (JP) ................. 2020-122845

(51) Int. Cl.
*B60C 9/04* (2006.01)
*B60C 9/00* (2006.01)
(Continued)

(52) U.S. Cl.
CPC .......... *B60C 9/2009* (2013.01); *B60C 9/0007* (2013.01); *B60C 9/0042* (2013.01);
(Continued)

(58) Field of Classification Search
CPC .... B60C 2009/0416; B60C 2009/0425; B60C 2009/0433; B60C 2009/0441;
(Continued)

(56) References Cited

U.S. PATENT DOCUMENTS 5,173,137 A * 12/1992 Okihara .............. B60C 15/0027
156/110.1
6,305,452 B1 * 10/2001 Sato ....................... B60C 9/2009
152/557
(Continued)

FOREIGN PATENT DOCUMENTS

JP 52126806 A * 10/1977
JP 60-80913 A 5/1985
(Continued)

OTHER PUBLICATIONS

Machine Translation: JP-2019156070-A, Chatani T, (Year: 2024).*
(Continued)

*Primary Examiner* — Kendra Ly
(74) *Attorney, Agent, or Firm* — Thorpe North & Western

(57) ABSTRACT

In a pneumatic tire provided with a carcass layer and a belt layer, the carcass layer is formed of an organic fiber cord having an elongation at break of 20% to 30%, an elongation in a sidewall portion under a load of 2.0 cN/dtex of 5.5% to 8.0%, and a product $A = D \times E_c$ of a fineness based on corrected mass D (unit: dtex/piece) and a count $E_c$ (unit: piece/50 mm) of $1.8 \times 10^5$ dtex/50 mm to $3.0 \times 10^5$ dtex/50 mm, and the belt layer is formed of a steel cord having a stress at break of 3300 MPa or more and a product $B = S \times E_b$ of a cross-sectional area S (unit: mm²/piece), and a count $E_b$ (unit: piece/50 mm) is from 6.0 mm²/50 mm to 7.5 mm²/50 mm.

5 Claims, 2 Drawing Sheets

(51) Int. Cl.
　　　*B60C 9/18*　　　(2006.01)
　　　*B60C 9/20*　　　(2006.01)

(52) U.S. Cl.
　　　CPC ........ *B60C 9/04* (2013.01); *B60C 2009/0425* (2013.01); *B60C 2009/0433* (2013.01); *B60C 2009/0441* (2013.01); *B60C 2009/045* (2013.01); *B60C 2009/0458* (2013.01); *B60C 2009/2077* (2013.01); *B60C 2009/2083* (2013.01); *B60C 2009/209* (2013.01); *B60C 2009/2093* (2013.01); *B60C 2009/2096* (2013.01)

(58) Field of Classification Search
　　　CPC ...... B60C 2009/045; B60C 2009/0458; B60C 2009/0466; B60C 2009/0475; B60C 2009/2074; B60C 2009/2077; B60C 2009/208; B60C 2009/2083; B60C 2009/2087; B60C 2009/209; B60C 2009/2093; B60C 2009/2096
　　　See application file for complete search history.

(56) References Cited

U.S. PATENT DOCUMENTS

| | | | |
|---|---|---|---|
| 2014/0018513 A1* | 1/2014 | Park | D01F 6/62 528/308.1 |
| 2018/0154695 A1* | 6/2018 | Takenaka | D02G 3/26 |
| 2019/0263180 A1 | 8/2019 | Sherhag et al. | |
| 2019/0329594 A1* | 10/2019 | Takenaka | B60C 9/0042 |
| 2022/0161602 A1* | 5/2022 | Fujimori | B60C 9/2009 |

FOREIGN PATENT DOCUMENTS

| | | | | |
|---|---|---|---|---|
| JP | S60-080913 | | 5/1985 | |
| JP | 61-188204 A | | 8/1986 | |
| JP | S61-188204 | | 8/1986 | |
| JP | 05238202 A | * | 9/1993 | ............ B60C 11/00 |
| JP | 11254919 A | * | 9/1999 | ......... B60C 15/0018 |
| JP | 11278013 A | * | 10/1999 | |
| JP | 2001233014 A | * | 8/2001 | |
| JP | 2006-56351 A | | 3/2006 | |
| JP | 2009-57008 A | | 3/2009 | |
| JP | 2017-031381 A | | 2/2017 | |
| JP | 2019-156047 A | | 9/2019 | |
| JP | 2019156070 A | * | 9/2019 | |
| JP | 2020-142702 A | | 9/2020 | |
| JP | 6915720 B1 | | 8/2021 | |
| WO | WO-2020145024 A1 | * | 7/2020 | ........... B60C 9/0007 |

OTHER PUBLICATIONS

Machine Translation: JP-11278013-A, Iida H, (Year: 2024).*
Machine Translation: JP-11254919-A, Kobayashi K, (Year: 2024).*
Machine translation: JP-05238202-A, Igarashi E, (Year: 2024).*
Machine translation: JP-52126806-A, Kuwayama O, (Year: 2024).*
Machine translation: JP-2001233014-A, Shimada Taku, (Year: 2025).*

\* cited by examiner

PNEUMATIC TIRE

TECHNICAL FIELD

The present technology relates to a pneumatic tire including a carcass layer formed by organic fiber cords.

BACKGROUND ART

A pneumatic tire generally includes a carcass layer mounted between a pair of bead portions, and the carcass layer is constituted by a plurality of reinforcing cords (carcass cords). Organic fiber cords are mainly used as the carcass cords. In particular, in a tire that requires excellent steering stability during high-speed travel, high-rigidity rayon fiber cords may be used (see, for example, Japan Unexamined Patent Publication No. 2017-031381 A).

On the other hand, in recent years, since there has been an increasing demand for weight reduction of tires and reduction in rolling resistance, thinner rubber gauges in a tread portion have been considered. However, in the case of a tire provided with the carcass layer formed of the rayon fiber cords described above, there is a concern that shock burst resistance may decrease along with the reduction in the thickness of the tread portion. Shock burst resistance is the durability of a tire against damage caused by a large shock received during travel, which causes the carcass to be broken (shock burst), and for example, a plunger energy test (which is a test for measuring a breakage energy when a tire is broken by pressing a plunger with a predetermined size into a tread central portion) is an index. Therefore, in order to improve shock burst resistance while ensuring performance similar to the case of using rayon fiber cords, the use of polyester fiber cords with predetermined physical properties has been considered. However, there was a problem that sufficient steering stability (high-speed steering stability) was not able to be always ensured by simply using such polyester fiber cords instead of rayon fiber cords, due to differences in their physical properties.

SUMMARY

The present technology provides a pneumatic tire that can provide improved shock burst resistance while satisfactorily maintaining steering stability during high-speed travel and provide them in a highly compatible manner.

A pneumatic tire according to an embodiment of the present technology includes a tread portion, a pair of sidewall portions, a pair of bead portions, at least one layer of a carcass layer, and a plurality of layers of belt layers. The tread portion extends in a tire circumferential direction and has an annular shape. The pair of sidewall portions are disposed on respective sides of the tread portion. The pair of bead portions are disposed in the sidewall portions on an inner side in a tire radial direction. The at least one layer of the carcass layer is mounted between the pair of bead portions. The plurality of layers of belt layers are disposed on an outer circumferential side of the carcass layer in the tread portion. The carcass layer is formed of a carcass cord made of an organic fiber cord. An elongation at break of the carcass cord is from 20% to 30%. An elongation under a load of 2.0 cN/dtex of the carcass cord in the sidewall portions is from 5.5% to 8.0%. A product $A=D \times Ec$ of a fineness based on corrected mass D (unit: dtex/piece) per the carcass cord and a count Ec (unit: piece/50 mm) of the carcass cords per 50 mm in a direction orthogonal to an extension direction of the carcass cord is from $1.8 \times 10^5$ dtex/50 mm to $3.0 \times 10^5$ dtex/50 mm. The belt layer is constituted of a belt cord formed of a steel cord. Stress at break of the belt cord is 3300 MPa or more. A product $B=S \times Eb$ of a cross-sectional area S (unit: $mm^2$/piece) per the belt cord and a count Eb (unit: piece/50 mm) of the belt cord per 50 mm in a direction orthogonal to an extension direction of the belt cord is from 6.0 $mm^2$/50 mm to 7.5 $mm^2$/50 mm.

In the present technology, since the carcass cord constituting the carcass layer is a polyester fiber cord having the physical properties described above, shock burst resistance can be improved while ensuring similar good high-speed steering stability as in the case of using a rayon fiber cord. Specifically, since the elongation at break of the carcass cord and the elongation under the load of 2.0 cN/dtex in the sidewall portion are in the ranges described above, the rigidity of the carcass cord can be appropriately ensured, and high-speed steering stability can be satisfactorily achieved. Further, since the carcass cord has the elongation at break described above, the carcass cord easily follows local deformation, the deformation during a plunger energy test (when the carcass cord is pressed by a plunger) can be sufficiently tolerated, and breakage energy can be improved. In other words, during travel, breakage durability against protrusion input of the tread portion is improved, so that shock burst resistance can be improved. Furthermore, the above-described product A, that is, the fineness of the carcass cord per unit width is within the range described above. Accordingly, durability and braking performance can be provided in a compatible manner, and consequently, it is advantageous to improve shock burst resistance and high-speed steering stability. On the other hand, since the belt layer is configured as described above, the strength of the entire belt layer can be reduced, and it is advantageous to supplement a disadvantage in the case of using the polyester fiber cord described above for the carcass cord and improve high-speed steering stability. Due to these cooperations, high-speed steering stability and shock burst resistance can be provided in a highly compatible manner.

Note that all of "the elongation at break" and "the elongation under a load of 1.5 cN/dtex" of the carcass cord (polyester fiber cord) refer to an elongation ratio (%) of a sample cord that is measured by conducting a tensile test under the conditions of a length of specimen between grips of 250 mm and a tensile speed of 300±20 mm/min in accordance with JIS (Japanese Industrial Standard) L1017 "Test methods for chemical fiber tire cords". "The elongation at break" is a value measured when a cord is broken, and "the elongation under a load of 1.5 cN/dtex" is a value measured when a load of 1.5 cN/dtex is applied. The "stress at break" of a belt cord (steel cord) is a value obtained by dividing the strength at break of the cord by the cross-sectional area of the cord.

In an embodiment of the present technology, the belt cord preferably has an N+M structure in which the number of wire strands of an inner layer N is from two to four and the number of wire strands of an outer layer M is from two to seven. In particular, the belt cord preferably has a 2+2 structure in which the number of the wire strands of the inner layer N is two and the number of the wire strands of the outer layer M is two. By thus using the belt cords having the specific structure, it is advantageous to properly set the strength of the belt layer to improve high-speed steering stability.

Additionally, in the belt cord described above, the wire strand constituting the inner layer is preferably arranged in a non-twisted state. By thus using the belt cords having the specific structure, it is advantageous to properly set the strength of the belt layer to improve high-speed steering stability.

DETAILED DESCRIPTION

Configurations of embodiments of the present technology will be described in detail below with reference to the accompanying drawings.

Figure 1:
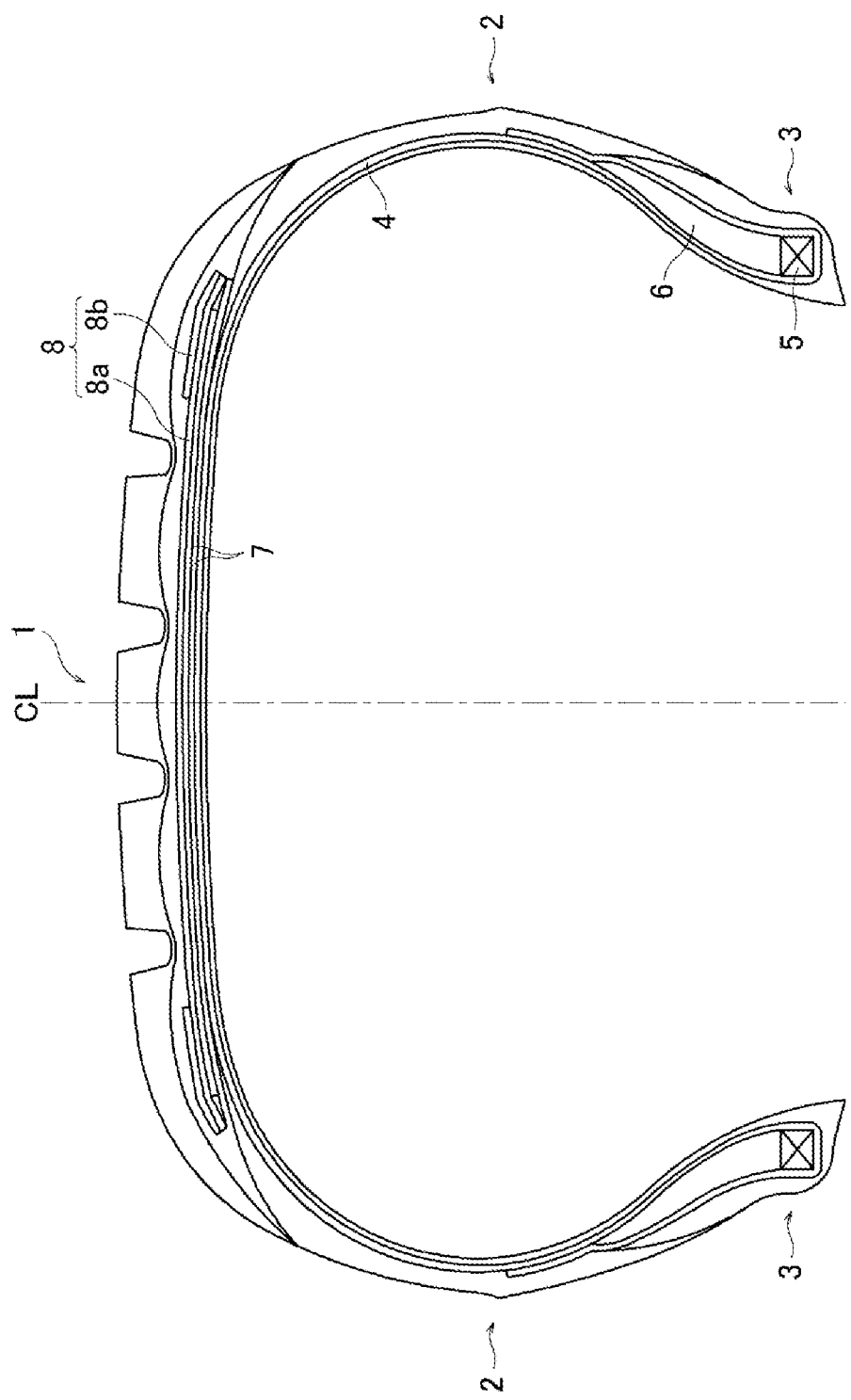
FIG. 1 is a meridian cross-sectional view illustrating a pneumatic tire according to an embodiment of the present technology.

As illustrated in FIG. 1, a pneumatic tire of an embodiment of the present technology includes a tread portion 1, a pair of sidewall portions 2 disposed on both sides of the tread portion 1, and a pair of bead portions 3 disposed in the sidewall portions 2 on the inner side in the tire radial direction. Note that "CL" in FIG. 1 denotes a tire equator. Although not illustrated in FIG. 1, which is a meridian cross-sectional view, the tread portion 1, the sidewall portions 2, and the bead portions 3 each extend in a tire circumferential direction to form an annular shape. This forms a toroidal basic structure of the pneumatic tire. Although the description using FIG. 1 is basically based on the illustrated meridian cross-sectional shape, all of the tire components each extend in the tire circumferential direction and form the annular shape.

A carcass layer 4 including a plurality of reinforcing cords (hereinafter referred to as carcass cords) extending in the tire radial direction is mounted between the pair of bead portions 3 on the right and left. A bead core 5 is embedded within each of the bead portions, and a bead filler 6 having an approximately triangular cross-sectional shape is disposed on an outer periphery of the bead core 5. The carcass layer 4 is folded back around the bead core 5 from an inner side to an outer side in the tire width direction. Accordingly, the bead core 5 and the bead filler 6 are wrapped by a body portion (a portion extending from the tread portion 1 through each of the sidewall portions 2 to each of the bead portions 3) and a folded back portion (a portion folded back around the bead core 5 of each bead portion 3 to extend toward each sidewall portion 2) of the carcass layer 4.

A plurality (in the illustrated example, two layers) of belt layers 7 are embedded on an outer circumferential side of the carcass layer 4 in the tread portion 1. Each of the belt layers 7 includes a plurality of reinforcing cords (hereinafter referred to as belt cords) inclining with respect to the tire circumferential direction, and the belt cords are disposed so as to intersect with one another between the layers. In the belt layers 7, an inclination angle of the belt cord with respect to the tire circumferential direction is set within a range of, for example, from 10° to 40°.

To improve the high-speed durability, a belt reinforcing layer 8 is further provided on an outer circumferential side of the belt layers 7. The belt reinforcing layer 8 includes a reinforcing cord (hereinafter referred to as a cover cord) oriented in the tire circumferential direction. As the cover cord, for example, an organic fiber cord can be used. In the belt reinforcing layer 8, the angle of the cover cord with respect to the tire circumferential direction is set to, for example, from 0° to 5°. As the belt reinforcing layer 8, a full cover layer 8a that covers the entire region of the belt layers 7 in the width direction, a pair of edge cover layers 8b that locally cover both end portions of the belt layers 7 in the tire width direction, or a combination thereof can be provided (in the example illustrated, both of the full cover layer 8a and the edge cover layers 8b are provided). The belt reinforcing layer 8 can be formed, for example, by helically winding a strip material made of at least a single cover cord arranged and covered with coating rubber in the tire circumferential direction.

The present technology mainly relates to the cords (the carcass cord and the belt cords) constituting the respective carcass layer 4 and belt layer 7 described above, and therefore the basic structure of the tire is not limited to that described above.

In an embodiment of the present technology, the carcass cord included in the carcass layer 4 is formed of a polyester fiber cord obtained by intertwining polyester fiber filament bundles. The elongation at break of the carcass cord (polyester fiber cord) ranges from 20% to 30% and preferably from 22% to 28%. The elongation under a load of 2.0 cN/dtex of the carcass cord in the sidewall portions ranges from 5.5% to 8.0% and preferably from 6.5% to 7.5%. Since the carcass cord (polyester fiber cord) having such physical properties is used for the carcass layer 4, while good steering stability similar to the case of using the conventional rayon fiber cord is ensured, shock burst resistance can be improved. That is, since the carcass cords have the above-described elongation properties, the rigidity of the carcass cords can be appropriately ensured and good steering stability can be exhibited. Further, since the carcass cord has the above-described elongation properties, the carcass cord easily follows local deformation, the deformation during a plunger energy test (when the carcass cord is pressed by a plunger) can be sufficiently tolerated, and breakage energy can be improved. In other words, during travel, breakage durability against protrusion input of the tread portion is improved, so that shock burst resistance can be improved. When the elongation at break of the carcass cord is less than 20%, the effect of improving shock burst resistance cannot be obtained. When the elongation at break of the carcass cord is more than 30%, intermediate elongation tends to be increased, and therefore rigidity is reduced and steering stability possibly deteriorates. When the elongation under a load of 2.0 cN/dtex is less than 5.5%, there is a possibility that cord rigidity becomes high, the compression strain of the turned up end portions of the carcass layer 4 is increased immediately below a ground contact region, and consequently the cord is broken (that is, durability is possibly impaired). When the elongation is more than 8.0% under a load of 2.0 cN/dtex, rigidity is difficult to be ensured, and the effect of improving high-speed steering stability possibly fails to be sufficiently obtained.

In addition, in the carcass layer 4, the product $A = D \times Ec$ of a fineness based on corrected mass D (unit: dtex/piece) per carcass cord and a count Ec (unit: piece/50 mm) per 50 mm of carcass cords in a direction orthogonal to an extension direction of the carcass cord is from $1.8 \times 10^5$ dtex/50 mm to $3.0 \times 10^5$ dtex/50 mm, and preferably from $2.2 \times 10^5$ dtex/50 mm to $2.7 \times 10^5$ dtex/50 mm. Since the product A described above is the fineness of the carcass cord per unit width in the carcass layer 4, when it satisfies the range described above, durability and braking performance can be improved, and as a result, it is advantageous for improving shock burst resistance and high-speed steering stability. The product A of less than $1.8 \times 10^5$ dtex/50 mm possibly deteriorates braking performance. The product A in excess of $3.0 \times 10^5$ dtex/50 mm narrows down the interval of the carcass cord, and thus maintaining durability is difficult. Note that the individual ranges of the fineness based on corrected mass D and the count Ec described above are not particularly limited as long as the product A satisfies the range described above.

Furthermore, the carcass cord preferably has a heat shrinkage rate of 0.5% to 2.5% and more preferably from 1.0% to 2.0%. Note that "heat shrinkage rate" is a dry heat shrinkage rate (%) of sample cords measured in accordance with JIS L1017 "Test methods for chemical fiber tire cords" with a length of specimen being 500 mm and when heated at 150° C. for 30 minutes. By using cords having such a heat shrinkage rate, the reduction in durability or the deterioration in uniformity due to the occurrence of kinking (such as twisting, breakage, wrinkling, and collapsing in shape) in the cords during vulcanization can be suppressed. In this case, when the heat shrinkage rate of the cord is less than 0.50%, kinking tends to occur during vulcanization, and thus it is difficult to favorably maintain durability. When the heat shrinkage rate of the cord exceeds 2.5%, uniformity may deteriorate.

Further, a carcass cord twist coefficient K represented by Formula (1) described below is preferably from 2000 to 2500 and is more preferably from 2100 to 2400. Note that the twist coefficient K is a value of the cord after dip treatment. Using a cord having such a twist coefficient K achieves good cord fatigue and can ensure excellent durability. In this case, when the twist coefficient K of the cord is less than 2000, the cord fatigue deteriorates, and thus it is difficult to ensure durability. When the twist coefficient K of the cord exceeds 2500, productivity of the cord deteriorates.

$$K = T \times D^{1/2} \tag{1}$$

(In the formula, T is a cable twist count of cord (count/10 cm), and D is the total fineness of cord (dtex))

While the carcass cord is made of the polyester fiber as described above, examples of the polyester fibers can include polyethylene terephthalate fibers (PET fibers), polyethylene naphthalate fibers (PEN fibers), polybutylene terephthalate fibers (PBT), and polybutylene naphthalate fibers (PBN), and PET fibers can be suitably used. Whichever fiber is used, the physical properties of the fiber advantageously provide the high-speed durability and the steering stability in a well-balanced and highly compatible manner. In particular, PET fibers, which are inexpensive, allow reduction in the cost of the pneumatic tire. In addition, workability in producing cords can be increased.

Figure 2:
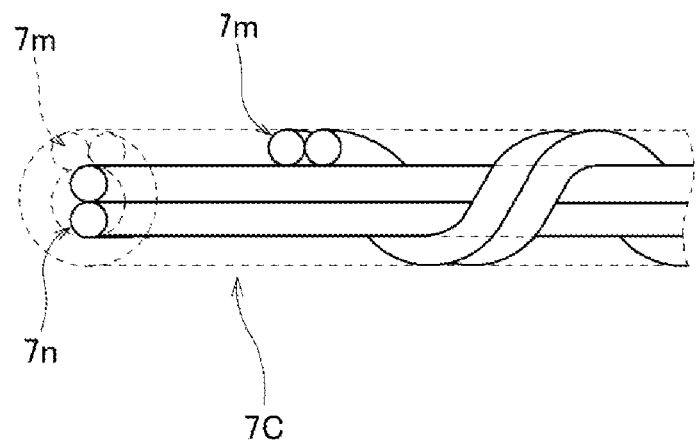
FIG. 2 is an explanatory diagram schematically illustrating a structure of a belt cord.

In an embodiment of the present technology, as illustrated in FIG. 2, a steel cord 7C constituting the belt layer 7 includes an N+M structure (in the illustrated example, 2+2 structure) that is formed of: an inner layer 7n (core) made of N pieces of wire strands; and an outer layer 7m (sheath) made of M pieces of wire strands intertwined around the inner layer 7n. The number of wire strands N of the inner layer 7n is 2 to 4, and the number of wire strands M of the outer layer 7m is 2 to 7. In particular, the illustrated 2+2 structure can be suitably employed. Additionally, the twist directions of the inner layer 7n and the outer layer 7m are not identical and are preferably different. In other words, when the inner layer 7n is S-twist, the outer layer 7m is preferably Z-twist, and when the inner layer 7n is Z-twist, the outer layer is preferably S-twist. When the inner layer 7n is non-twisted, the outer layer 7m is preferably S-twist or Z-twist. In particular, in an embodiment of the present technology, it is preferred that the wire of the inner layer 7n is non-twisted (a state in which the wire strands are not intertwined but arranged). When the number of wire strands N of the inner layer of the steel cord 7C constituting the belt layer 7 is less than two, an initial elongation of the cords is degraded. When the number of wire strands N of the inner layer of the steel cord 7C constituting the belt layer 7 exceeds four, the twisted structure is not stable. When the number of wire strands M of the outer layer of the steel cord 7C constituting the belt layer 7 is less than two, cord strength is insufficient. When the number of wire strands M of the outer layer of the steel cord 7C constituting the belt layer 7 exceeds seven, the twisted structure is not stable.

The belt cord of an embodiment of the present technology has a stress at break of 3300 MPa or more and preferably from 3300 MPa to 3800 MPa. Further, in the belt layer 7, a product $B = S \times Eb$ of a cross-sectional area S (unit: mm²/piece) per belt cord and the count Eb (unit: piece/50 mm) of the belt cord per 50 mm in the direction orthogonal to the extension direction of the belt cord is from 6.0 mm²/50 mm to 7.5 mm²/50 mm, and preferably from 6.2 mm²/50 mm to 7.2 mm²/50 mm. The belt layer 7 thus configured allows the strength of the entire belt layer 7 to be suppressed, and a disadvantage in the case of using the polyester fiber cord described above for the carcass cord is supplemented and high-speed steering stability can be improved. At this time, in a case where the stress at break of the belt cord is less than 3300 MPa, the count Eb needs to be increased to ensure belt strength, and therefore a tire weight increases and high-speed steering stability is reduced. When the product $B = S \times Eb$ is less than 6.0 mm²/50 mm, the strength of the plunger decreases due to insufficient belt strength. The product $B = S \times Eb$ in excess of 7.5 mm²/50 mm increases the tire weight and decreases high-speed steering stability. Note that the individual ranges of the cross-sectional area S and the count Eb described above are not particularly limited as long as the product B satisfies the range described above.

An embodiment of the present technology will further be described below by way of Examples, but the scope of an embodiment of the present technology is not limited to Examples.

EXAMPLE

Pneumatic tires of Conventional Example 1, Comparative Examples 1 to 4, and Examples 1 to 11 that had a tire size of 245/45R20 and the basic structure illustrated in FIG. 1, included the carcass layer with the material of the carcass layer, the cord structure, the fineness based on corrected mass D (unit: dtex/piece) per carcass cord, the count E (unit: piece/50 mm) per 50 mm in a direction orthogonal to an extension direction of the carcass cord, the product of them $A = D \times E$, elongation at break (unit: %), and elongation under a load of 2.0 cN/dtex (unit: %) set as in Table 1, and the belt layer with the structure of the belt cord, the stress at break (unit: MPa), the cross-sectional area S (unit: mm²/piece) per belt cord, the count Eb (unit: piece/50 mm) of the belt cord per 50 mm in the direction orthogonal to the extension direction of the belt cord, and the product of them $B = S \times Eb$ set as in Table 1 were manufactured.

In Table 1, all of "the elongation at break" and "the elongation under a load of 2.0 cN/dtex" of the carcass cord were measured by conducting a tensile test under the conditions of a length of specimen between grips of 250 mm and a tensile speed of 300±20 mm/min in accordance with JIS L1017 "Test methods for chemical fiber tire cords". Specifically, "the elongation at break" is the elongation ratio (%) of the sample cord measured at break of the cord, and "the elongation under a load of 2.0 cN/dtex" is the elongation ratio (%) of the sample cord measured under a load of 2.0 cN/dtex. In addition, "the stress at break" of the belt cord was calculated by dividing the strength at break of the cord by the cord cross-sectional area.

In Table 1, the column of the material of carcass cord is indicated as "rayon" when rayon fiber cords were used and "PET" when polyethylene terephthalate fiber cords were used.

These test tires were evaluated for shock burst resistance (plunger energy), high-speed steering stability, and tire weight by an evaluation method described below, and the results are also shown in Table 1.

Shock Burst Resistance (Plunger Energy)

Each of the test tires was assembled on a wheel having a rim size of 20×8J and inflated to an air pressure of 220 kPa. Tire breakage tests (plunger breakage tests) were performed by pressing a plunger having a plunger diameter of 19 mm±1.6 mm against the central portion of the tread at a loading speed (plunger pressing speed) of 50.0 mm±1.5 m/min in accordance with JIS K6302, and tire strength (tire breakage energy) was measured. Evaluation results are expressed by an index value with the measurement value of Conventional Example 1 as 100. Larger values indicate larger breakage energy (plunger energy) and superior shock burst resistance. Especially, the index value of "130" or more means that good performance is obtained.

High-Speed Steering Stability

Each of the test tires was assembled on a wheel having a rim size of 20×8J, inflated to an air pressure of 200 kPa, and mounted on a test vehicle having an engine displacement of 2000 cc. Sensory evaluations for high-speed steering stability were performed on a test course including dry road surfaces by test drivers with two occupants riding in the vehicle. The evaluation results were rated by a 5-point method with the result of Conventional Example 1 assigned 3.0 (reference) and expressed as average points by five test drivers excluding the highest point and the lowest point. Larger evaluation values indicate superior high-speed steering stability.

Tire Weight

The weight of each test tire was measured. Evaluation results are expressed by an index value with the measurement value of Conventional Example 1 as 100. Smaller index values indicate smaller tire weights.

TABLE 1-1

|  |  |  | Conventional Example 1 | Comparative Example 1 | Comparative Example 2 |
|---|---|---|---|---|---|
| Carcass layer | Material of carcass cord |  | Rayon | Rayon | PET |
|  | Product A | dtex/50 mm | $2.6 \times 10^5$ | $2.6 \times 10^5$ | $2.1 \times 10^5$ |
|  | Elongation at break | % | 14.0 | 14.0 | 17.0 |
|  | Elongation under 2.0 cN/dtex load | mm | — | — | 5.0 |
| Belt layer | Cord structure |  | 2 + 2 × 0.25 | 2 + 2 × 0.25 | 2 + 2 × 0.25 |
|  | Stress at break | MPa | 3,100 | 3400 | 3,100 |
|  | Product B | mm²/50 mm | 8.0 | 7.5 | 8.0 |
| Evaluation | Shock burst resistance (Plunger energy) | Index value | 100 | 100 | 120 |
|  | High-Speed Steering Stability |  | 3.0 | 3.2 | 2.8 |
|  | Tire weight | Index value | 100 | 96 | 95 |

TABLE 1-2

|  |  |  | Comparative Example 3 | Comparative Example 4 | Example 1 |
|---|---|---|---|---|---|
| Carcass layer | Material of carcass cord |  | PET | PET | PET |
|  | Product A | dtex/50 mm | $2.1 \times 10^5$ | $2.5 \times 10^5$ | $2.5 \times 10^5$ |
|  | Elongation at break | % | 17.0 | 23.0 | 23.0 |
|  | Elongation under 2.0 cN/dtex load | mm | 5.0 | 6.5 | 6.5 |
| Belt layer | Cord structure |  | 2 + 2 × 0.25 | 2 + 2 × 0.25 | 2 + 2 × 0.25 |
|  | Stress at break | MPa | 3400 | 3,100 | 3400 |
|  | Product B | mm²/50 mm | 7.5 | 8.0 | 7.5 |
| Evaluation | Shock burst resistance (Plunger energy) | Index value | 120 | 190 | 190 |
|  | High-Speed Steering Stability |  | 3.0 | 2.8 | 3.0 |
|  | Tire weight | Index value | 92 | 100 | 96 |

TABLE 1-3

|  |  |  | Example 2 | Example 3 | Example 4 |
|---|---|---|---|---|---|
| Carcass layer | Material of carcass cord |  | PET | PET | PET |
|  | Product A | dtex/50 mm | $2.5 \times 10^5$ | $2.5 \times 10^5$ | $2.5 \times 10^5$ |
|  | Elongation at break | % | 23.0 | 23.0 | 23.0 |
|  | Elongation under 2.0 cN/dtex load | mm | 6.5 | 6.5 | 6.5 |
| Belt layer | Cord structure |  | $2 + 2 \times 0.25$ | $2 + 2 \times 0.25$ | $2 + 2 \times 0.25$ |
|  | Stress at break | MPa | 3400 | 3700 | 3700 |
|  | Product B | mm²/50 mm | 7.2 | 7.2 | 7.0 |
| Evaluation | Shock burst resistance (Plunger energy) | Index value | 185 | 190 | 185 |
|  | High-Speed Steering Stability |  | 3.2 | 3.2 | 3.3 |
|  | Tire weight | Index value | 94 | 93 | 90 |

TABLE 2-1

|  |  |  | Example 5 | Example 6 | Example 7 | Example 8 |
|---|---|---|---|---|---|---|
| Carcass layer | Material of carcass cord |  | PET | PET | PET | PET |
|  | Product A | dtex/50 mm | $1.8 \times 10^5$ | $3.0 \times 10^5$ | $2.5 \times 10^5$ | $2.5 \times 10^5$ |
|  | Elongation at break | % | 23.0 | 23.0 | 23.0 | 23.0 |
|  | Elongation under 2.0 cN/dtex load | mm | 6.5 | 6.5 | 5.5 | 8.0 |
| Belt layer | Cord structure |  | $2 + 2 \times 0.25$ | $2 + 2 \times 0.25$ | $2 + 2 \times 0.25$ | $2 + 2 \times 0.25$ |
|  | Stress at break | MPa | 3700 | 3700 | 3700 | 3700 |
|  | Product B | mm²/50 mm | 7.0 | 7.0 | 7.0 | 7.0 |
| Evaluation | Shock burst resistance (Plunger energy) | Index value | 183 | 187 | 185 | 185 |
|  | High-Speed Steering Stability |  | 3.0 | 3.3 | 3.3 | 3.3 |
|  | Tire weight | Index value | 90 | 90 | 90 | 90 |

TABLE 2-2

|  |  |  | Example 9 | Example 10 | Example 11 |
|---|---|---|---|---|---|
| Carcass layer | Material of carcass cord |  | PET | PET | PET |
|  | Product A | dtex/50 mm | $2.5 \times 10^5$ | $2.5 \times 10^5$ | $2.5 \times 10^5$ |
|  | Elongation at break | % | 20.0 | 30.0 | 23.0 |
|  | Elongation under 2.0 cN/dtex load | mm | 6.5 | 6.5 | 6.5 |
| Belt layer | Cord structure |  | $2 + 2 \times 0.25$ | $2 + 2 \times 0.25$ | $2 + 2 \times 0.25$ |
|  | Stress at break | MPa | 3700 | 3700 | 4000 |
|  | Product B | mm²/50 mm | 7.0 | 7.0 | 6.0 |
| Evaluation | Shock burst resistance (Plunger energy) | Index value | 183 | 187 | 180 |
|  | High-Speed Steering Stability |  | 3.3 | 3.3 | 3.5 |
|  | Tire weight | Index value | 90 | 90 | 88 |

As can be seen from Table 1, in comparison to the Conventional Example 1, while the tires of Examples 1 to 11 provided satisfactorily high-speed steering stability, the tires improved shock burst resistance and reduced the tire weight. On the other hand, in Comparative Example 1, since the carcass cord was a rayon fiber cord, even when the belt cord satisfied the requirements of an embodiment of the present technology, shock burst resistance was not able to be improved. In Comparative Example 2, since the elongation at break of the carcass cord and the elongation under a load of 1.5 cN/dtex were small and the stress at break of the belt cords was small and the product B was large, and thus high-speed steering stability was reduced. In Comparative Example 3, the elongation at break and the elongation under a load of 1.5 cN/dtex of the carcass cord were small, and thus the effect of improving high-speed steering stability was not obtained. In Comparative Example 4, since the stress at break of the belt cord was small and the product B was large, high-speed steering stability was deteriorated.

The invention claimed is:
1. A pneumatic tire, comprising:
  a tread portion extending in a tire circumferential direction and having an annular shape;
  a pair of sidewall portions disposed on respective sides of the tread portion;
  a pair of bead portions disposed in the sidewall portions on an inner side in a tire radial direction;

at least one layer of a carcass layer mounted between the pair of bead portions;

a plurality of layers of belt layers disposed on an outer circumferential side of the carcass layer in the tread portion;

the carcass layer being formed of a carcass cord made of an organic fiber cord, an elongation at break of the carcass cord being from 20% to 30%, an elongation under a load of 2.0 cN/dtex of the carcass cord in the sidewall portions being from 5.5% to 8.0%, a product $A = D \times Ec$ of a fineness based on corrected mass D (unit: dtex/piece) per the carcass cord and a count Ec (unit: piece/50 mm) of the carcass cords per 50 mm in a direction orthogonal to an extension direction of the carcass cord being from $2.2 \times 10^5$ dtex/50 mm to $3.0 \times 10^5$ dtex/50 mm, the belt layer being constituted of a belt cord formed of a steel cord, stress at break of the belt cord being 3300 MPa or more, a product $B = S \times Eb$ of a cross-sectional area S (unit: mm²/piece) per the belt cord and a count Eb (unit: piece/50 mm) of the belt cord per 50 mm in a direction orthogonal to an extension direction of the belt cord being from 6.0 mm²/50 mm to 7.5 mm²/50 mm, wherein the organic fiber cord of carcass layer is a polyester fiber cord formed of intertwined polyester fiber filament bundles, the organic fiber cord of the carcass layer has a heat shrinkage rate of 0.5% to 2.5% when heated at 150° C. for 30 minutes, the carcass layer is folded back around a bead core embedded within each of the bead portions from an inner side to an outer side in the tire width direction, and the bead core and a bead filler are fully wrapped by a body portion and a folded back portion of the carcass layer.

2. The pneumatic tire according to claim 1, wherein the belt cord has an N+M structure in which the number of wire strands of an inner layer N is from two to four and the number of wire strands of an outer layer M is from two to seven.

3. The pneumatic tire according to claim 2, wherein the belt cord has a 2+2 structure in which the number of the wire strands of the inner layer N is two and the number of the wire strands of the outer layer M is two.

4. The pneumatic tire according to claim 3, wherein the wire strand constituting the inner layer is arranged in a non-twisted state.

5. The pneumatic tire according to claim 2, wherein the wire strand constituting the inner layer is arranged in a non-twisted state.

* * * * *